United States Patent [19]

Craig

[11] Patent Number: 4,772,798

[45] Date of Patent: Sep. 20, 1988

[54] OPTICAL SCANNING APPARATUS

[75] Inventor: Ian M. Craig, Lothian, Scotland

[73] Assignee: Ferranti plc, Cheshire, England

[21] Appl. No.: 19,562

[22] Filed: Feb. 27, 1987

[30] Foreign Application Priority Data

Feb. 28, 1986 [GB] United Kingdom ............... 8602008

[51] Int. Cl.$^4$ ............................ G01J 1/00; G02B 26/10
[52] U.S. Cl. .................................... 250/353; 250/334; 350/6.8
[58] Field of Search .................. 250/334, 347, 353; 350/6.6, 6.7, 6.8

[56] References Cited

U.S. PATENT DOCUMENTS

| | | | |
|---|---|---|---|
| 4,084,909 | 4/1978 | Mathisen | 350/6.8 |
| 4,123,134 | 10/1978 | Meyers | 350/6.7 |
| 4,486,662 | 12/1984 | Abel | 250/334 |
| 4,487,473 | 12/1984 | Hatch et al. | 350/6.8 |

FOREIGN PATENT DOCUMENTS 1483118  8/1977  United Kingdom .

Primary Examiner—Janice A. Howell
Attorney, Agent, or Firm—Kerkam, Stowell, Kondracki & Clarke

[57] ABSTRACT

The apparatus comprises a radiation-sensitive detector (17) and optical means for directing radiation from an observed field of view on to the detector. The optical means includes a rotatable support member (10) rotatable about an axis (11) and carrying a number of reflecting members (12) equally-spaced around it. Each reflecting member (12) is located in a plane parallel to the axis (11) of the support member and each is arranged at the same non-perpendicular angle to a radius of the support member. A pivoted reflecting member (14) is located inside the locus of the plurality of reflecting members (12) and is rotatable about an axis (15) located in a plane perpendicular to that axis (15). In operation radiation from the field of view is reflected by the pivoted reflecting member (14) on to successive ones of the rotating reflecting members (12) and thence on to the detector (17).

6 Claims, 2 Drawing Sheets

OPTICAL SCANNING APPARATUS

This invention relates to optical scanning apparatus primarily, though not exclusively, for use in the infrared region of the optical spectrum. Such apparatus is used to produce a representation of a viewed scene when more conventional means such as television cameras are unable to operate due to low or zero illumination conditions. Under these circumstances it is known to use a detector sensitive to thermally-induced radiation and a scanning system to provide a visual image of the scene.

Many forms of such scanning apparatus are known, some using a rotating drum carrying reflecting faces and used to scan a field of view in one direction with an oscillating mirror providing scanning in a perpendicular direction. Such forms of apparatus tend to have fairly large and complex optical systems due to the need to relay an image of the detector produced on one scanning surface on to the other scanning surface. These optical systems add to the cost and weight of the apparatus.

Other forms of apparatus use two rotating drums which, whilst not requiring the relay optics produce a scanning sequence which is not easily duplicated for the video display. These require some form of electronic signal processing which again adds to the cost of the apparatus.

It is an object of the present invention to provide optical scanning apparatus which avoids the above-mentioned problems.

According to the present invention there is provided optical scanning apparatus which includes a radiation-sensitive detector, and optical means for directing radiation from an observed field of view on to the detector, the optical means comprising a support member rotatable about an axis and carrying a plurality of equally-spaced reflecting members each arranged in a plane parallel to said axis of rotation and all at the same non-perpendicular angle to a radius of the support member, and a pivoted reflecting member located within the locus of said plurality of reflecting members and rotatable through a limited angle about an axis located in a plane perpendicular to said axis of rotation, the arrangement being such that, in operation, radiation from said field of view is reflected by said pivoted reflecting member on to successive ones of the plurality of rotating reflecting members and thence on to said detector.

BRIEF DESCRIPTION OF THE DRAWINGS

The invention will now be described with reference to the accompanying drawings, in which:

Referring now to FIG. 1, an annular support member 10 is supported for rotation about an axis 11, perpendicular to the plane of the annulus, by some drive means (not shown). The support member 10 carries on one surface a number of mirrors 12, equally spaced around the periphery of the member and each arranged perpendicular to the surface of the support member 10. In addition the angle between a radius of the support member and the reflecting surface 13 of each mirror 12 is the same and is different from 90°.

Figure 1:
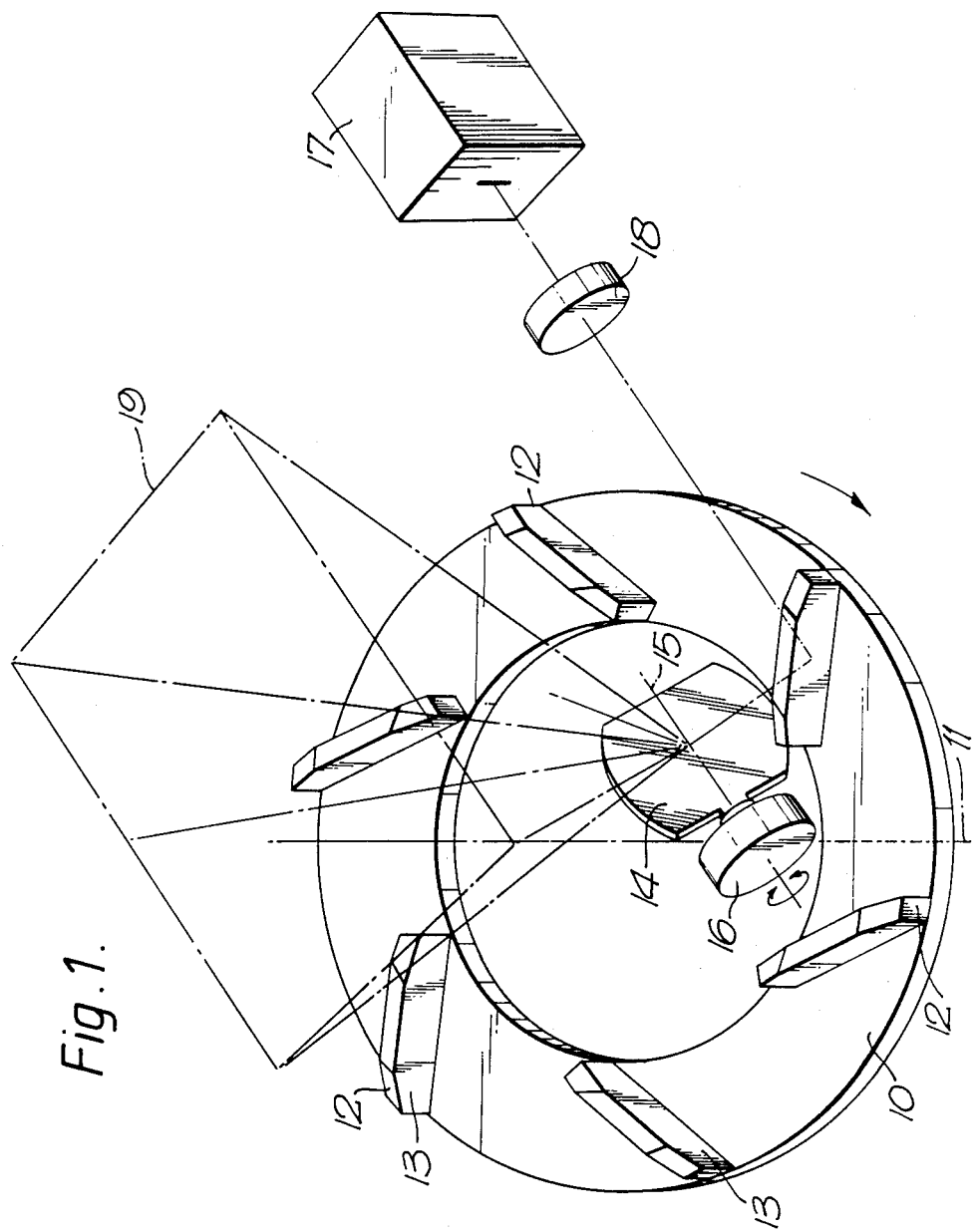
FIG. 1 is a schematic view of the apparatus according to an embodiment of the invention.

A mirror 14 is located inside the annulus 10 and is pivoted about an axis 15 which is in a plane parallel to the plane of the support member 10. Axis 15 lies in the same plane as mirror 14. A motor 16 controls the rotation of the mirror 14 through a limited angle about the axis 15.

A detector 17 is positioned so that radiation reflected from the pivoted mirror 14 on to a rotatable mirror 12 is focussed on to the detector 17 by a lens 18. The source of the radiation is a field of view illustrated schematically at 19 and could be modified by a telescope (not shown). The axis of the radiation reflected from pivoted mirror 14 by way of mirror 12 on the detector 17 will, in the simplest arrangement, lie in the plane containing the axis of rotation 15 of the pivoted mirror 14 and parallel to the plane of the annulus 10. A motor 16 controls the movement of the mirror 14 through a limited angle about the axis 15.

Figure 2:
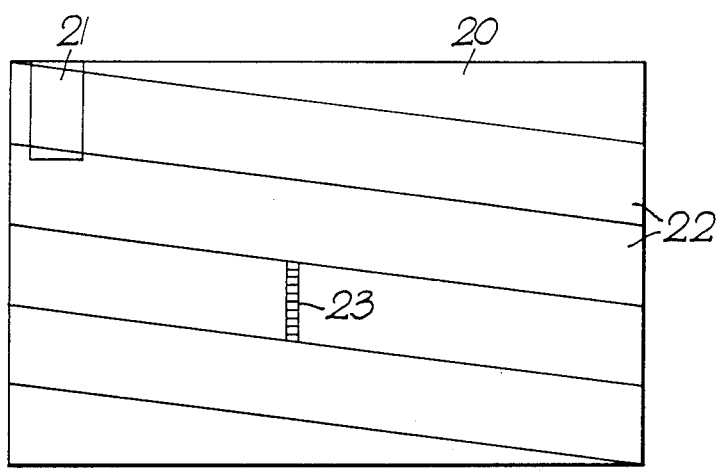
FIG. 2 is a diagram illustrating the scanning pattern.

In operation the support member 10 is rotated at a constant speed whilst pivoting mirror 14 rotates from one end of its range of movement to the other at a constant rate and then returns rapidly to its starting point so that the cycle may be repeated. The starting point can be changed for alternate fields to achieve an interlace. The effect of this scanning action is shown in FIG. 2. In FIG. 2 the rectangle 20 represents the field of view to be scanned. If the area of the detector is considered to be shown on a very much enlarged scale as the area 21, then the scanning action effectively causes the detector to scan across the field of view in swathes 22 inclined at an angle to the horizontal and vertical axis of the field of view 20. Each swathe is produced by successive rotating mirrors 12, and the relative speeds of movement of the rotating mirrors 12 and the pivoted mirror 14 are such that the entire area of the field of view is covered by successive swathes.

In practice a very large number of swathes would be necessary to scan a complete field of view with a single-element detector to provide reasonable definition. It is preferable, therefore, to use a detector comprising a linear array of detector elements extending in a vertical direction as shown in FIG. 2 at 23. This enables the field of view to be scanned more rapidly.

The field of view could be scanned in horizontal swathes if the pivoted mirror 14 was moved in discrete steps by a stepping motor 16 rather than continuously.

Figure 3:
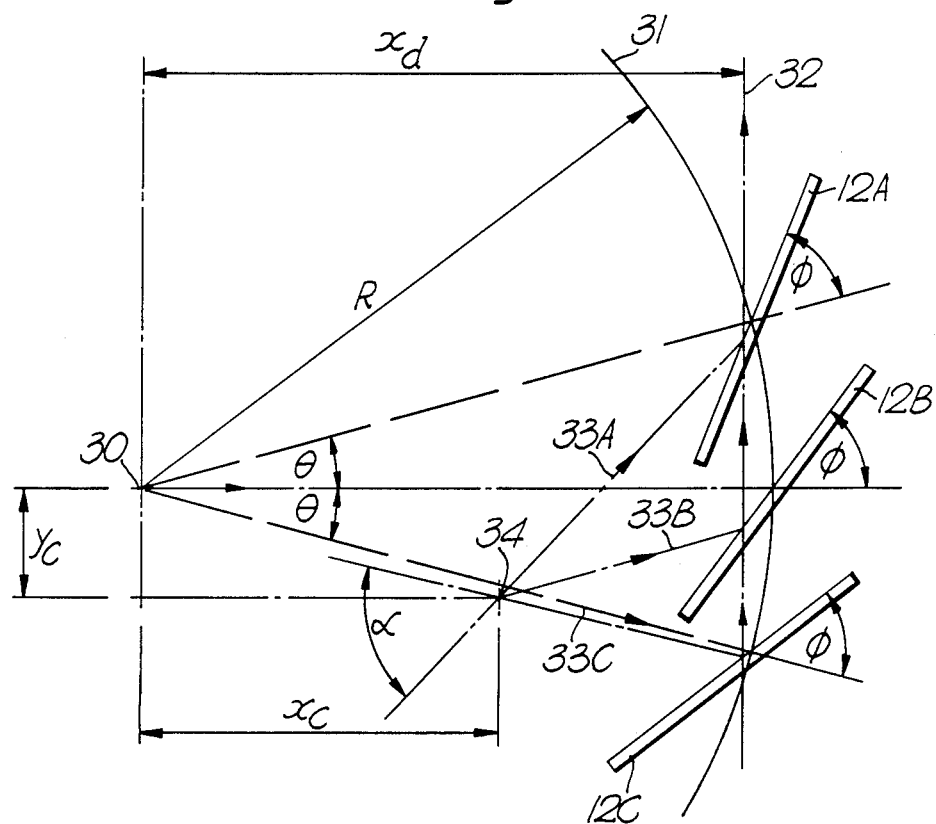
FIG. 3 is a diagram illustrating the operation of the embodiment of FIG. 1.

The position of the centre of mirror 14 is of some importance. FIG. 3 is a diagram showing the movement of a single one of the rotating mirrors 12 between the two limiting positions at which it reflects radiation on to the detector 17.

Referring now to FIG. 3, the point 30 is the centre of rotation of the support member 10 and R is the radius of the locus 31 of the centres of the mirrors 12. The line 32 is the axis along which radiation reflected from the mirror 12 passes to the detetor, and the distance of this line in one coordinate direction from the centre of rotation 30 is shown as xd. One mirror 12 is shown in three positions as it rotates in a clockwise direction. Reference 12A denotes the mirror in position at the start of its scan, 12B shows the mirror in its mid-scan position, and 12C denotes the mirror at the end of its scan. Radiation leaving the mirror 12A along the axis 32 must be incident on the mirror along the direction 33A. Similarly, radiation leaving the mirror 12B must be incident on the mirror along the direction 33B. Finally, radiation leaving the mirror 12C along the axis 32 must be incident on the mirror along the direction 33C. If the distance xd has been calculated accurately the three directions 33A, 33B and 33C intersect at a point 34. The centre of the pivoting mirror 14 is located at this point, whose coordinates are defined as xc and yc as shown on the drawing.

Also shown in FIG. 3 are the angle of inclination $\phi$ of the mirror 12 to a radius of the locus 31 and an angle $\theta$ denoting half the angle through which the mirror 12 rotates during its scan. The horizontal field of view is $4\theta°$ wide. The vertical field of view is determined by the angle through which the pivoted mirror 14 turns during its scanning phase. By way of example only the horizontal field of view may be of the order of 60° and the vertical field of view 40°.

There is a relationship between the angle $\phi$, the radius R of the locus 32 and the three dimensions xc, yc and xd. For example, assuming the radius R to have a value of unity and the angle $\phi$ to be 53°, then it may be determined that $xc=0.568, yc=0.175$ and $xd=0.951$.

FIG. 3 illustrated the ideal case in which the three directions 33A, 33B and 33C intersected at the point 34. In practice the ideal case may be difficult to realise because of the physical size of the various components, particularly the motor 16 and mirror 14 which have to be located inside the annular support member 10. It may therefore be necessary to accept a non-ideal situation in order to locate the necessary components physically without having to make the radius R larger. Such an arrangement does not define a single point at which the directions of incident radiation upon the mirror 12 intersect, and a condition known as "pupil wander" will arise. However, this can be accepted so long as it does not seriously affect the definition of the scanning operation nor the scanning pattern.

The scanning apparatus described may be used with any optical radiation, but its primary purpose is for use at infra-red frequencies to provide "thermal" images. In such a case the detector 17 will include an assembly for maintaining the detector element or elements at a sufficiently low temperature to ensure correct operation. The reflecting surfaces carried by the support member may in fact be formed integral with the support member and manufactured to a highly reflecting finish.

What we claim is:

1. Optical scanning apparatus which includes a radiation-sensitive detector, and optical means for directing radiation from an observed field of view on to the detector, the optical means comprising a support member rotatable about an axis and carrying a plurality of equally-spaced reflecting members, each arranged in a locus in a plane parallel to said axis of rotation and all at the same non-perpendicular angle to a radius of the support member, and a pivoted reflecting member located inside the locus of said plurality of reflecting members and rotatable through a limited angle about an axis located in a plane perpendicular to said axis of rotation such that, in operation, radiation from said field of view is reflected by said pivoted reflecting member on to successive ones of the plurality of rotating reflecting members and thence along an axis directed outside said locus on to said detector, the optical center of the pivoted reflecting member being located virtually at the point of intersection of the optical axes extending from the detector by way of each successive one of the rotating reflecting members.

2. Apparatus as claimed in claim 1 in which the plurality of reflecting members are formed integral with the support member.

3. Apparatus as claimed in claim 1 in which the pivoted reflecting member moves at a steady rate from one limit of its movement to the other.

4. Apparatus as claimed in claim 1 in which the plane containing the axis of the pivoted reflecting member passes through the center of each of the plurality of rotatable reflecting members.

5. Apparatus as claimed in claim 1 in which the detector includes a linear array of detecting elements.

6. Apparatus as claimed in claim 1 in which the detector is sensitive to radiation at infra-red frequencies.

* * * * *

UNITED STATES PATENT AND TRADEMARK OFFICE
CERTIFICATE OF CORRECTION

PATENT NO. : 4,772,798

DATED : September 20, 1988

INVENTOR(S) : Ian Muir CRAIG

It is certified that error appears in the above-identified patent and that said Letters Patent is hereby corrected as shown below:

On the title page

-- [30] Foreign Application Priority Data

February 28, 1986 [GB] United Kingdom ....8605008 --.

Signed and Sealed this

Fourth Day of July, 1989

Attest:

DONALD J. QUIGG

*Attesting Officer*   *Commissioner of Patents and Trademarks*